United States Patent [19]

Yasuhara et al.

[11] 4,272,822
[45] Jun. 9, 1981

[54] APPARATUS FOR CONVERTING A MECHANICAL DISPLACEMENT TO AN ELECTRICAL SIGNAL

[75] Inventors: Takeshi Yasuhara; Keiichiro Tago, both of Kawasaki, Japan

[73] Assignee: Fuji Electric Co., Ltd., Kawasaki, Japan

[21] Appl. No.: 64,798

[22] Filed: Aug. 8, 1979

[30] Foreign Application Priority Data

Aug. 17, 1978 [JP] Japan ................................. 53-99546

[51] Int. Cl.³ .............................................. G12B 1/00
[52] U.S. Cl. ...................................... 364/481; 73/718; 364/556
[58] Field of Search ............................... 364/480–483, 364/571, 573, 556, 560; 73/718, 304 C; 361/271, 272, 283, 284, 287; 324/71 R

[56] References Cited

U.S. PATENT DOCUMENTS

| | | | |
|---|---|---|---|
| 3,620,083 | 11/1971 | Dimeff et al. | 73/718 |
| 3,646,538 | 2/1972 | Frick | 340/200 |
| 3,652,930 | 3/1972 | Sugiyama et al. | 364/482 |
| 3,742,347 | 6/1973 | Walton | 73/718 |
| 4,089,036 | 5/1978 | Geronime | 361/283 |
| 4,196,632 | 4/1980 | Sikorra | 73/718 |

FOREIGN PATENT DOCUMENTS

52-76950  6/1977  Japan .
53-16696  6/1978  Japan .

*Primary Examiner*—Errol A. Krass
*Attorney, Agent, or Firm*—Spencer & Kaye

[57] ABSTRACT

Apparatus for converting a mechanical displacement to an electrical signal having a capacitor type displacement detector for detecting a mechanical displacement in terms of capacitances C1 and C2 of two capacitors and means for producing a signal corresponding to (C1−C2)/(C1+C2). The capacitance sum (C1+C2) is converted into a pulse with the duty ratio D proportional to the capacitance sum and a voltage Vd' corresponding to the capacitance difference (C1−C2) is multiplied by the reciprocal 1/D of the duty ratio D so as to produce a current proportional to a desired amount (C1−C2)/(C1+C2). Even if the difference voltage changes widely, the duty ratio D is not affected by this change and therefore the linearity error is not increased.

6 Claims, 8 Drawing Figures

APPARATUS FOR CONVERTING A MECHANICAL DISPLACEMENT TO AN ELECTRICAL SIGNAL

BACKGROUND OF THE INVENTION

1. Field of the Invention

The present invention relates to an apparatus in which a mechanical displacement proportional to a load change which is proportional to a quantity of a measured value such as pressure difference, pressure or liquid level is detected in terms of a variation of capacitance, and the capacitance variation is converted into a corresponding electric signal which is transmitted to a receiving apparatus. More particularly, the invention relates to a converting apparatus in which a pair of capacitors, the capacitances of which differentially change in response to a mechanical displacement, are used to produce the sum of and the difference between the capacitances of the capacitors. The sum and the difference are used to derive the amount of (capacitance difference)/(capacitance sum) as a ratio of the change of the capacitances, and then the ratio is converted into an electrical signal proportional thereto.

2. Prior Art

In a capacitor type displacement detector (a so-called ΔC cell), a diaphragm for detecting a load change proportional, for example, to a pressure difference ΔP is disposed at the middle position between electrodes, and a capacitance C1 between the diaphragm and one electrode and a capacitance C2 between the diaphragm and the other electrode are obtained as follows:

$$C1 = \frac{\epsilon A}{(d - \Delta d)} \text{ and}$$
$$C2 = \frac{\epsilon A}{(d + \Delta d)},$$

where ε:dielectric factor, A:electrode area, d:distance between electrode and diaphragm, and Δd:amount of diaphragm displacement. The sum and difference of these two capacitances are given as follows:

$$C1 + C2 = \frac{\epsilon A \cdot 2d}{d^2 - (\Delta d)^2}$$
$$C1 - C2 = \frac{\epsilon A \cdot 2\Delta d}{d^2 - (\Delta d)^2}.$$

Therefore, the following equation is obtained.

$$\frac{C1 - C2}{C1 + C2} = \frac{\Delta d}{d} \propto \Delta P$$

As seen from the above equation, a pressure difference ΔP may be detected by producing an electric signal proportional to (C1−C2)/(C1+C2).

In a known capacitor type displacement converter disclosed in Japanese Patent Application Publication No. 16,696/1978 published on June 2, 1978, a DC voltage Vi proportional to the difference between a pair of capacitances C1 and C2 and a DC voltage Vr proportional to the sum of these capacitances C1 and C2 are detected. Then, (C1−C2)/(C1+C2) is obtained by performing a division of Vi/Vr. In order to improve this displacement converter, Japanese Patent Application No. 154,321/1975 filed on Dec. 23, 1975 (Japanese Laid-Open Patent Application No. 76,950/1977 laid open on June 28, 1977) was proposed. In this displacement converter, the difference voltage Vi and the sum voltage Vr are converted into a pulse having a duty ratio corresponding to Vi/Vr. In this converter, however, the duty ratio changes, when the difference voltage Vi varies widely, resulting in a disadvantage in that there is an increase in the linearity error.

SUMMARY OF THE INVENTION

With the above in view, an object of the present invention is to provide a converting apparatus which overcomes the above-mentioned disadvantage of the prior art.

Another object of the present invention is to provide a converting apparatus in which a correct pulse conversion is effected so that a measured quantity is converted into an electrical signal precisely proportional to the measured quantity.

According to the invention, there is provided a converting apparatus comprising:

displacement detecting means including first and second capacitors having, respectively, first and second capacitances which differentially change in response to a mechanical displacement applied thereto and an oscillating source for supplying a predetermined AC signal to the first and second capacitors. The displacement detecting means produces a sum signal proportional to the sum of the first and second capacitances and a difference signal proportional to a difference between the first and second capacitances;

a first converting circuit receiving the sum signal from the displacement detecting means for converting the sum signal into a pulse signal with a duty ratio corresponding to the sum of the first and second capacitances;

a second converting circuit receiving the difference signal from the displacement detecting means for converting the difference signal into a voltage corresponding to the difference between the first and second capacitances; and a third converting circuit receiving the pulse signal from the first converting circuit and the voltage from the second converting circuit. The third converting circuit multiplies the reciprocal of the duty ratio by the voltage to produce an output signal corresponding to the ratio of the capacitance difference to the capacitance sum.

With these objects in mind, the following description, by way of nonlimiting embodiments of this invention, is given in conjunction with the following drawings.

DESCRIPTION OF THE PREFERRED EMBODIMENTS

Figure 1:
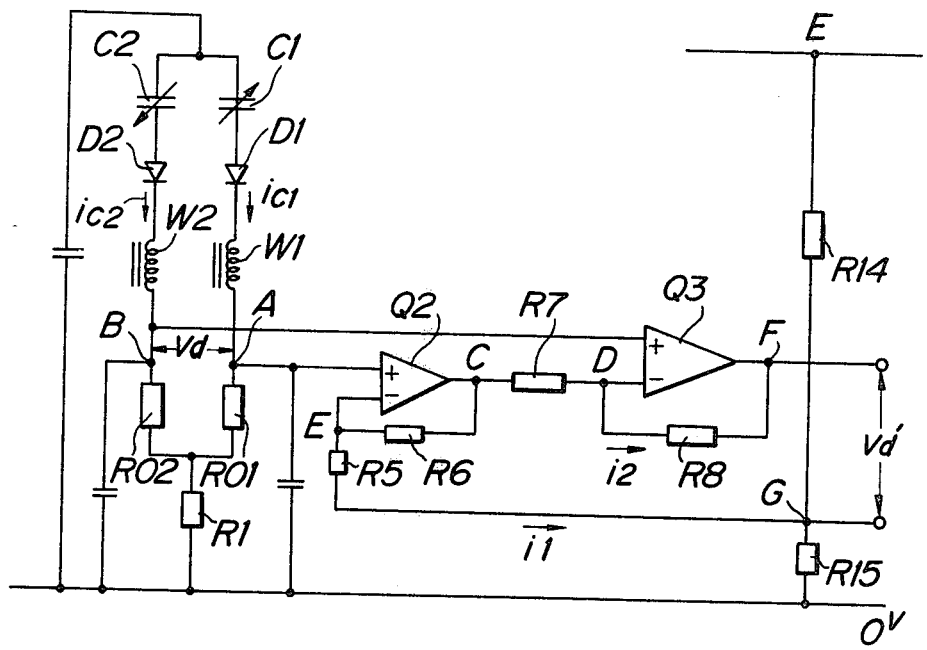
FIG. 1 is a circuit diagram showing an embodiment of a capacitance difference/voltage converting circuit in a converting apparatus according to the invention.

FIG. 1 shows an embodiment of a capacitance difference to voltage converting circuit for converting a capacitance difference (C1−C2) between first and second capacitors C1 and C2 of a capacitor type displacement detector, in accordance with the present invention. The capacitors C1 and C2 change their capacitance values C1 and C2 differentially in response to a mechanical displacement applied thereto. In FIG. 1, AC voltages each with the peak-to-peak voltage v and with frequency f are derived from transformer windings W1 and W2 coupled to an oscillating source (not shown) and are applied to the capacitors C1 and C2 through diodes D1 and D2, respectively, so that currents iC1 and iC2 are supplied to the capacitors C1 and C2, respectively. Here, the currents iC1 and iC2 are given as follows:

$$iC1 = f \cdot v \cdot C1$$

$$iC2 = f \cdot v \cdot C2.$$

The other ends of the respective windings W1 and W2 are connected, through respective resistors R01 and R02, commonly to a resistor R1. The resistors R01 and R02 have resistance value R0. The potential difference Vd between the resistors R01 and R02 is given as follows:

$$Vd = (iC1 - iC2) \cdot R0 = f \cdot v \cdot R0 \cdot (C1 - C2).$$

The output signals at the terminals A and B of the resistors R01 and R02 are applied to the positive side input terminals of differential amplifiers Q2 and Q3, respectively. The output terminal C of the differential amplifier Q2 is connected to the negative side input terminal D of the differential amplifier Q3 through a resistor R7. The output terminal C is also connected to provide feedback to the negative side input terminal E of the differential amplifier Q2 through a resistor R6. The output terminal F of the differential amplifier Q3 is connected to provide feedback to the negative side input terminal D of the differential amplifier Q3. The negative side input terminal E of the differential amplifier Q2 is connected to the connection point G between resistors R14 and R15 via a resistor R5. The other terminal of the resistor R14 is coupled to a DC power source voltage E. The other terminal of the resistor R15 is connected to ground. With such a circuit arrangement, a voltage Vd′ proportional to the capacitance difference (C1−C2) is produced between the points F and G. The reason for this production of voltage Vd′ follows.

In the differential amplifier Q2, the output at point C varies in such a manner that the voltage at the point E is always equal to the voltage at the point A. As a result, the feedback current i1 flows through the resistor R5. Accordingly, $$iC1 \cdot R0 = i1 \cdot R5$$

is obtained. Therefore, the feedback current i1 has the following relation.

$$i1 = iC1 \cdot (R0/R5)$$

At the output point C, the following equation is formed.

$$i1 \cdot (R5 + R6) = iC1 \cdot R0 \cdot (1 + \frac{R6}{R5}).$$

In the differential amplifier Q3, the output point F varies in such a manner that the voltage at the point D is always equal to the voltage at the point B. That is to say, the feedback current i2 flows through the resistor R8. Here, the current i2 is a value resulting from the division of a potential difference between the points C and B by the resistor R7, and therefore the current i2 has the following relation.

$$i2 = \frac{1}{R7} \{iC1 \cdot R0 (1 + \frac{R6}{R5}) - iC2 \cdot R0\}$$

In addition, the point F has a potential level larger by i2·R8 than the potential level at the point D, i.e., at the point B and therefore the output voltage Vd′ is obtained as follows.

$$Vd' = iC2 \cdot R0 - \frac{R8}{R7} \{(iC1 - iC2)R0 + iC1 \cdot R0 \cdot \frac{R6}{R5}\}.$$

Here, if the respective resistance values of the resistors R5 to R8 are selected to satisfy $$(R8/R7) \times (R6/R5) = 1,$$

the following relation is obtained.

$$Vd' = -(iC1 - iC2)R0(1 + \frac{R8}{R7}) = -Vd(1 + \frac{R8}{R7}).$$

Hence, the following equation is obtained.

$$Vd' = -f \cdot v \cdot R0 \cdot (1 + \frac{R8}{R7}) \cdot (C1 - C2)$$

From this equation, it will be seen that the output voltage Vd′ is proportional to the capacitance difference (C1−C2).

Figure 2:
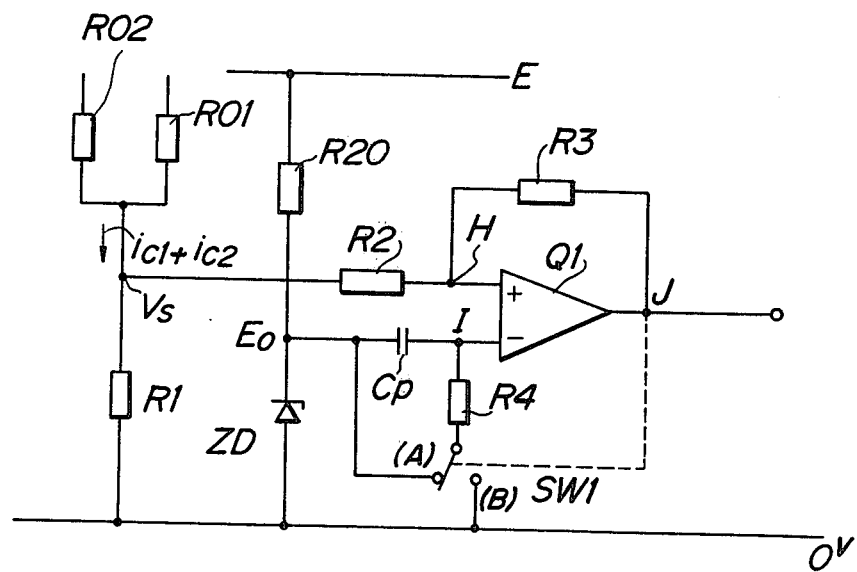
FIG. 2 is a circuit diagram showing an embodiment of a pulse converting circuit in a converting apparatus according to the invention.

FIG. 2 shows an embodiment of a pulse converting circuit for producing a pulse with a duty ratio D proportional to the capacitance sum (C1+C2) from the first and second capacitors C1 and C2 shown in FIG. 1, in accordance with the present invention. Here, the sum current iC1+iC2 flows into the resistor R1 already referred to in FIG. 1 so that the voltage Vs is applied to the positive side input terminal H of a differential amplifier Q1 through the resistor R2. The voltage E0 at the connection point between a zener diode ZD and a resistor R20 connected in series between the power source voltage E and ground is applied to the negative input terminal I of the differential amplifier Q1 through a capacitor Cp. The output point J of the differential amplifier Q1 is connected to provide feedback to the positive input terminal H via a resistor R3. The negative side input terminal I is connected through the resistor R4 to the common terminal of a switch SW1 (for example, a C-MOS type analog switch), the switching terminal (A) of the switch SW1 is connected to the point at voltage E0 and the switching terminal (B) of the switch SW1 is connected to ground. The switching operation of the switch SW1 is controlled by the output pulse from the differential amplifier Q1. More specifically, when the differential amplifier Q1 produces a high level output signal, the switch SW1 is switched to the position (A), while the switch is turned to the position (B) when the differential amplifier Q1 produces a low level output signal. The duty ratio D of the output pulse obtained from the output point J of the differential amplifier Q1 is proportional to the capacitance sum C1+C2 for the reason explained below.

Figure 3A:
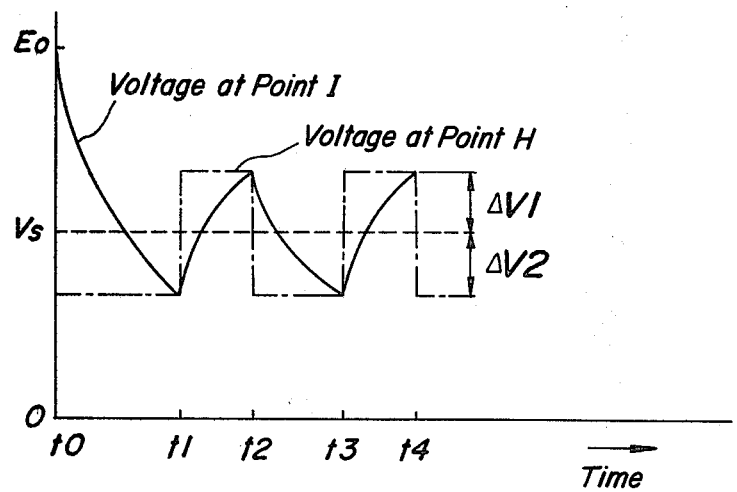
FIGS. 3A and 3B illustrate waveforms for explaining the operation of the circuit shown in FIG. 2.
Figure 3B:
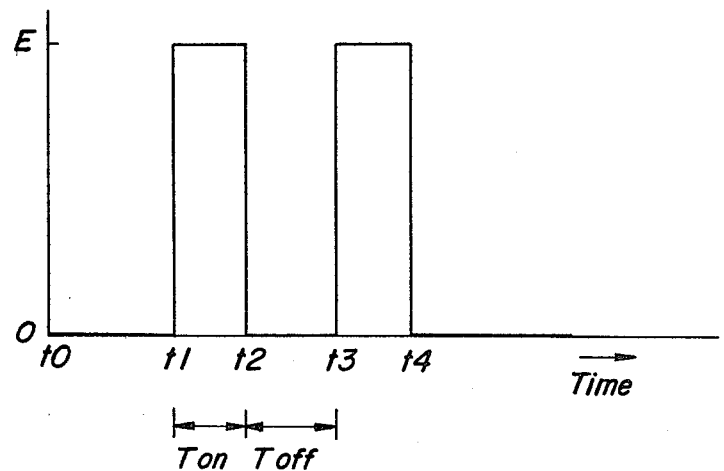

Assuming that the power source E is turned on at an instant t0, the voltage at the point I becomes E0 as illustrated in FIG. 3A and is higher than the potential at the point H (E0>Vs). Accordingly, the potential at the output point J of the differential amplifier Q1 is 0, as illustrated in FIG. 3B and the switch SW1 is at the position (B). The potential at the point H is $$Vs \times \frac{R3}{R2+R3} = Vs - \frac{R2}{R2+R3} \times Vs = Vs - \Delta V2,$$
$$\text{where } \Delta V2 = \frac{R2}{R2+R3} \times Vs.$$

Thus, the capacitor Cp is charged through the resistor R4 by the voltage E0. At the same time, the voltage at the point I decreases from the potential E0 toward 0 potential (ground) at the speed determined by time constant CpR4.

If the potentials at the points H and I are equal to each other at an instant t1 (strictly speaking, the potential at the point I is slightly lower than that at the point H at the instant t1), the potential at the point J suddenly changes from 0 to E, as illustrated in FIG. 3B. As a result, the switch SW1 turned to the position (A) and the potential at the point H becomes $$Vs + (E - Vs)\frac{R2}{R2+R3} = Vs + \Delta V1,$$
$$\text{where}$$
$$\Delta V1 = (E - Vs)\frac{R2}{R2+R3}.$$

Upon the turning of the switch SW1 to the position (A), the charge in the capacitor Cp discharges through the resistor R4 and the potential at the point I increases toward the voltage E0 at the speed of the time constant CpR4, as illustrated in FIG. 3A.

Further, if the voltages at the points H and I are equal to each other at an instant t2 (strictly speaking, the potential at the point I is slightly larger than the potential at the point H at the instant t2), the voltage at the output point J suddenly decreases to 0. Accordingly, the switch SW1 is turned to the position (B), the voltage at the point H becomes Vs−ΔV2 and the capacitor Cp is charged through the resistor R4 by the voltage E0. Therefore, the voltage at the point I decreases toward 0 at the speed of the time constant CpR4.

At an instant t3, a state similar to that at the instant t1 is obtained and then the operations between the instants t1 and t2 and between the instants t2 and t3 will be repeated successively.

The potential at the point I between the instants t1 and t2 is expressed as follows.

$$(Vs - \Delta V2) + \{E0 - (Vs - \Delta V2)\}(1 - e^{-\frac{1}{CpR4}t})$$

Assume now that the time period (t2−t1) during which the voltage at the output point J is E is designated by Ton. This period Ton is the time period at the end of which the voltage at the point I becomes (Vs+ΔV1) and is given by the following equation.

$$(Vs - \Delta V2) + \{E0 - (Vs - \Delta V2)\}(1 - e^{-\frac{Ton}{CpR4}}) = (Vs + \Delta V1)$$

This equation is modified as follows:

$$\{E0 - (Vs - \Delta V2)\}\left[1 - \left(1 - \frac{Ton}{CpR4} + \frac{1}{2}(\frac{Ton}{CpR4})^2 - \frac{1}{6}(\frac{Ton}{CpR4})^3 + \ldots\right)\right] = V1 + \Delta V2.$$

In the above equation, if the magnitude of the hysteresis of the voltage at the point H, i.e. ΔV1+ΔV2, is considerably smaller than voltages E0 and Vs, the terms succeeding to the square term (Ton/CpR4)² are negligible and therefore the following relation is obtained from the above equation.

$$\{E0 - (Vs - \Delta V2)\}(\frac{Ton}{CpR4}) = \Delta V1 + \Delta V2$$

This equation is modified to the following equation (1).

$$Ton = \frac{\Delta V1 + \Delta V2}{E0 - (Vs - \Delta V2)} \cdot CpR4 \quad (1)$$
$$\approx \frac{\Delta V1 + \Delta V2}{E0 - Vs} \cdot CpR4$$

The voltage at the point I between the instants t2 and t3 is given by the following expression.

$$(Vs + \Delta V1)e^{-\frac{1}{CpR4}t}$$

Assuming that the time period (t3−t2) during which the output point J is at 0 level is designated by Toff. This period is the time period at the end of which the voltage at the point I becomes (Vs−ΔV2) and is given by the following equation.

$$(Vs + \Delta V1)e^{-(Toff/CpR4)} = Vs - \Delta V2$$

This equation is modified in the following manner.

$$(Vs + \Delta V1)\{1 - (Toff/CpR4) + \frac{1}{2}(Toff/CpR4)^2 - (1/6)(Toff/CpR4)^3 + \ldots \} = Vs - \Delta V2$$

If ΔV1+ΔV2<<Vs, the terms succeeding to the square term (Toff/CpR4)² is negligible, as in the above-mentioned case, so that the following equation is derived.

$$Toff = \frac{\Delta V1 + \Delta V2}{Vs + \Delta V1} \cdot CpR4 \quad (2)$$
$$\approx \frac{\Delta V1 + \Delta V2}{Vs} \cdot CpR4$$

The duty ratio D of the output pulse at the output point J is given by the following equation.

$$D = \frac{Ton}{Ton + Toff}$$

Substituting equations (1) and (2) into the above equation, the following result is obtained.

$$D = \frac{\frac{\Delta V1 + \Delta V2}{E0 - Vs} \cdot CpR4}{\frac{\Delta V1 + \Delta V2}{E0 - Vs} \cdot CpR4 + \frac{\Delta V1 + \Delta V2}{Vs} \cdot CpR4} \quad (3)$$

$$= \frac{Vs}{E0}$$

Since $Vs = (iC1 + iC2)R1 = fvR1(C1 + C2)$, equation (3) is modified as follows.

$$D = (1/E0)fvR1(C1 + C2)$$

That is to say, the duty ratio D of the output pulse at the output point J is proportional to the capacitance sum (C1+C2).

Figure 4:
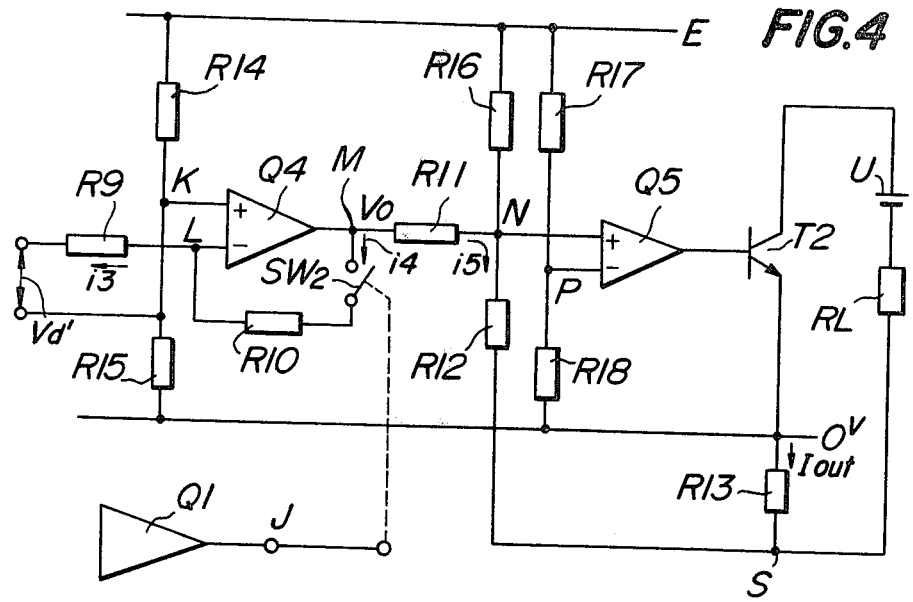
FIG. 4 is a circuit diagram showing an embodiment of division and current converting circuits in a converting apparatus according to the invention.
Figure 5A:
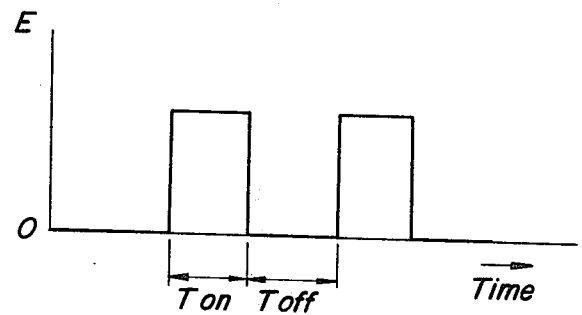
FIGS. 5A and 5B illustrate signal waveforms for explaining the operation of the circuit shown in FIG. 4.
Figure 5B:
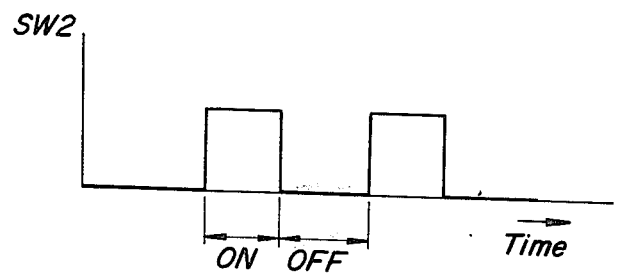

FIG. 4 shows an embodiment of division and current converting circuits in which, on the basis of a pulse signal having the duty ratio proportional to the capacitance sum (C1+C2) and the voltage proportional to the capacitance difference (C1−C2) formed by the circuit shown in FIGS. 1 and 2, (C1−C2)/(C1+C2) is calculated and the result of this calculation is produced in the form of current. Here, the voltage Vd' proportional to the capacitance difference (C1−C2) obtained from the circuit shown in FIG. 1 is applied between one terminal of a resistor R9 and the connection point between resistors R14 and R15. This connection point is connected to the positive side input terminal K of a differential amplifier Q4 and the other input terminal of the resistor R9 is coupled with the negative side input terminal L of the differential amplifier Q4. The output point M of the differential amplifier Q4 is connected in feedback fashion to the negative side input terminal L of this differential amplifier Q4, through a switch SW2 such as a C-MOS analog switch and a resistor R10. The switch SW2 is controlled by the output pulse of a differential amplifier Q1 (FIG. 2). That is to say, when the output pulse is at high level as illustrated in FIG. 5A, the switch SW2 is closed as illustrated in FIG. 5B. On the other hand, when the output pulse is at low level, the latter switch SW2 is opened.

The output point M of the differential amplifier Q4 is connected to the positive side input terminal N of a differential amplifier Q5 through a resistor R11. Connected between this terminal N and the power source voltage E is a resistor R16 and resistors R12 and R13 are connected in series between terminal N and ground. Further, connected in series between power source voltage E and ground are resistors R17 and R18. The connection point between resistors R17 and R18 is connected to the negative side input terminal P of the differential amplifier Q5. The output signal from the differential amplifier Q5 is supplied to the base of an output transistor T2. The emitter of the transistor T2 is grounded. A power supply source U and a load RL are connected in series between the collector of the transistor T2 and the connection point S between resistors R12 and R13. With the division and current converting circuits thus constructed, a current Iout proportional to (C1−C2)/(C1+C2) flows through the resistor R13. The reason for this current Iout will be discussed below.

In the differential amplifier Q4, the voltage at the point K is fixed and the voltage Vo at the output point M varies so that the voltage at the point L is always equal to that at the point K. As a result, a feedback current i3 flows as follows.

$$i3 = Vd'/R9$$

This current i3 is the average value of a current i4 flowing from the point M to the terminal L through the resistor R10. The current i4 flows only during the time period Ton during which the switch SW2 is closed so that the average current over one period (Ton+Toff) is $$\frac{Ton}{Ton + Toff} \cdot i4$$

Here, $i4 = Vo/R10$, and $i3 = Vd'/R9$.
Therefore, the average current is expressed as follows.

$$\frac{Vo}{R10} \cdot \frac{Ton}{Ton + Toff} = \frac{Vd'}{R9}$$

The output voltage Vo of the differential amplifier Q4 is derived from the above equation as follows.

$$Vo = \frac{R10}{R9} \cdot \frac{Ton + Toff}{Ton} \cdot Vd'$$

Here, $$Vd' = K1(C1 - C2)$$

$$Vs = K2(C1 + C2),$$

where K1 and K2 are constant.
By using equation (3), the above equation of the output voltage Vo is modified as follows.

$$Vo = \frac{R10}{R9} \cdot \frac{E0}{Vs} \cdot K1(C1 - C2)$$

$$= E0 \cdot \frac{R10}{R9} \cdot \frac{K1(C1 - C2)}{K2(C1 + C2)}$$

$$= K3 \cdot \frac{C1 - C2}{C1 + C2},$$

where K3 is constant.

In the differential amplifier Q5, the voltage at the point P is fixed and an output current Iout is so controlled that the voltage at the point N is always equal to that at the point P. More specifically, the output current Iout has the following relationship with a current i5 flowing from the resistor R11 to the resistor R12.

$$Iout \cdot R13 = i5 \cdot R12.$$

The current i5 is expressed as follows.

$$i5 = Vo/R11$$

Therefore, the above equation is modified to the following equation.

$$Iout \cdot R13 = (Vo/R11) \cdot R12$$

Accordingly, $$Iout = Vo \cdot \frac{1}{R13} \cdot \frac{R12}{R11}$$

$$= K4 \cdot \frac{C1 - C2}{C1 + C2}.$$

where K4 is constant. Thus, the output current Iout flowing through the resistor R13 is proportional to (C1−C2)/(C1+C2).

Figure 6:
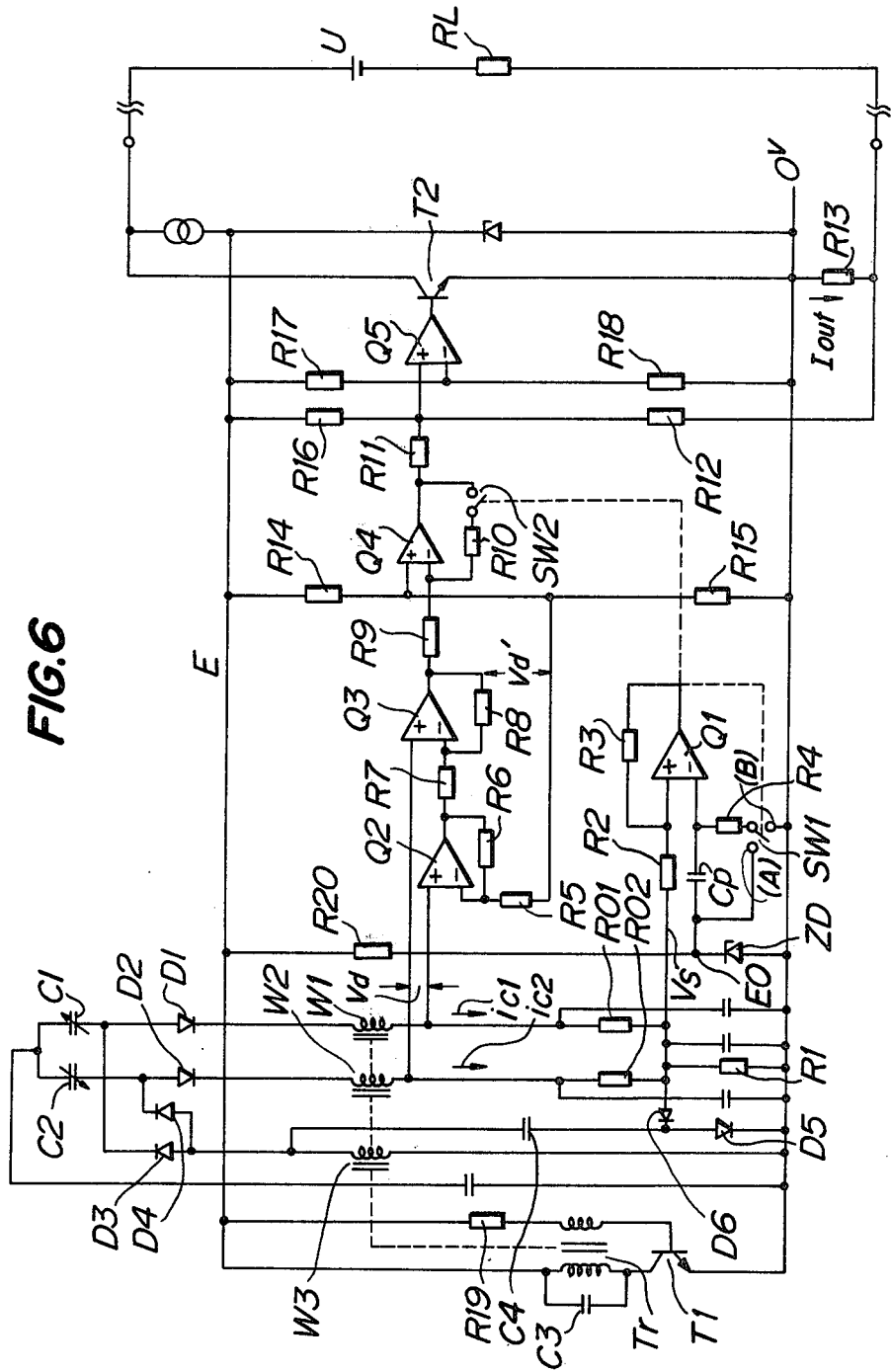
FIG. 6 is a circuit diagram showing an overall construction of an embodiment of a converting apparatus according to the invention.

FIG. 6 shows an embodiment of a displacement converting apparatus according to the invention which is a combination of the capacitance difference to voltage converting circuit shown in FIG. 1, the pulse converting circuit shown in FIG. 2 and the division and current converting circuits shown in FIG. 4. Like reference numerals are used to designate the corresponding portions in FIGS. 1, 2 and 4 and the explanation thereof will be omitted. In FIG. 6, a transformer Tr, a capacitor C3, a transistor T1 and a resistor R19 co-operate to form a Hartley type oscillator, in which the output signal is derived from transformer windings W1, W2 and W3. The output from the winding W3 is applied to the capacitors C1 and C2 through diodes D3 and D4. The diodes D3 and D4 are connected with polarities opposite to those of the diodes D1 and D2. Connected in series between the winding W3 and ground point are a capacitor C4 and a diode D5. Between the connection point between the capacitor C4 and the diode D5 and the common connection point among the resistors R01, R02 and R1 a diode D6 is connected, for the purpose of compensating stray capacitances between the terminals of capacitors C1 and C2.

As seen from the foregoing description, according to the present invention, the capacitance sum (C1+C2) is converted into a pulse with the duty ratio D proportional to the capacitance sum and the voltage Vd' corresponding to the capacitance difference (C1−C2) is multiplied by the reciprocal number 1/D of the duty ratio D so as to produce a current proportional to a desired amount (C1−C2)/(C1+C2). According to the present invention, unlike the above-mentioned prior art, even if the change of the difference voltage is large, the duty ratio D is not affected by that change and therefore the linearity error is not increased.

The invention has been described in detail with reference to preferred embodiments, and it will now be apparent from the foregoing to those skilled in the art that the invention is not limited to the above-mentioned embodiment, but that within the scope of the invention various changes and modifications may be made in the circuit for converting the capacitance sum (C1+C2) into the pulse with the duty ratio D proportional to the capacitance sum, the circuit for producing the voltage Vd' proportional to the capacitance difference (C1−C2) and the circuit for multiplying the voltage Vd' by the reciprocal number 1/D of the duty ratio D.

What is claimed is:

1. Converting apparatus comprising:
displacement detecting means including first and second capacitors having, respectively, first and second capacitances which differentially change in response to a mechanical displacement applied thereto, and means for coupling an oscillating source for supplying a predetermined AC signal to said first and second capacitors, said displacement detecting means producing a sum signal proportional to the sum of said first and second capacitances and a difference signal proportional to the difference between said first and second capacitances;
a first converting circuit receiving the sum signal from said displacement detecting means, said first converting circuit converting said sum signal into a pulse signal with a duty ratio corresponding to the sum of said first and second capacitances;
a second converting circuit receiving the difference signal from said displacement detecting means, said second converting circuit converting said difference signal into a voltage corresponding to the difference between said first and second capacitances; and
a third converting circuit receiving said pulse signal from said first converting circuit and said voltage from said second converting circuit, said third converting circuit multiplying the reciprocal of said duty ratio by said voltage to produce an output signal corresponding to the ratio of said difference signal to said sum signal.

2. A converting apparatus as claimed in claim 1, wherein said displacement detecting means has a first diode, a first winding and a first resistor connected in series with said first capacitor; a second diode, a second winding and a second resistor connected in series with said second capacitor; and a third resistor connected in common with said first and second resistors, said AC signal from said oscillating source being supplied to said first and second windings, said difference signal being the difference between first and second currents flowing, respectively, through said first and second resistors, and said sum signal being the sum of said first and second currents flowing through said third resistor.

3. A converting apparatus as claimed in claim 1, wherein said first converting circuit includes a first differential amplifier having a first input terminal connected to one terminal of said third resistor and an output terminal connected to said first terminal of said first differential amplifier, a first switch controlled by the output signal from said first differential amplifier, and a time constant circuit receiving a predetermined voltage for effecting sequential charging and discharging under the control of said first switch, an output signal from said time constant circuit being applied to a second input terminal of said differential amplifier, said pulse signal being derived from said output terminal of said first differential amplifier.

4. A converting apparatus as claimed in claim 1, wherein said second converting circuit includes a second differential amplifier having a first input terminal connected to one terminal of said first resistor and an output terminal connected to a second input terminal of said second differential amplifier and a third differential amplifier having a first input terminal connected to one terminal of said second resistor and an output terminal connected to a second input terminal of said third differential amplifier, said voltage corresponding to said difference between said first and second capacitances being produced between said output terminal of said third differential amplifier and said second input terminal of said second differential amplifier.

5. A converting apparatus as claimed in claim 1, wherein said third converting circuit includes a fourth differential amplifier to which said voltage from said second converting means is applied and a second switch through which an output terminal of said fourth differential amplifier is connected to a first input terminal of said fourth differential amplifier, said second switch being controlled by said pulse signal from said first converting circuit, said output signal corresponding to the ratio of said difference signal to said sum signal being derived from said output terminal of said fourth differential amplifier.

6. A converting apparatus as claimed in claim 2, wherein said first converting circuit includes a first differential amplifier having a first input terminal connected to one terminal of said third resistor and an output terminal connected to said first terminal of said first differential amplifier, a first switch controlled by the output signal from said first differential amplifier, and a time constant circuit receiving a predetermined voltage for effecting sequential charging and discharging under the control of said first switch, an output signal from said time constant circuit being applied to a second input terminal of said differential amplifier, said pulse signal being derived from said output terminal of said first differential amplifier; said second converting circuit includes a second differential amplifier having a first input terminal connected to one terminal of said first resistor and an output terminal connected to a second input terminal of said second differential amplifier and a third differential amplifier having a first input terminal connected to one terminal of said second resistor and an output terminal connected to a second input terminal of said third differential amplifier, said voltage corresponding to said difference between said first and second capacitances being produced between said output terminal of said third differential amplifier and said second input terminal of said second differential amplifier; and said third converting circuit includes a fourth differential amplifier to which said voltage between said output terminal of said third differential amplifier and said second input terminal of said second differential amplifier is applied and a second switch through which an output terminal of said fourth differential amplifier is connected to a first input terminal of said fourth differential amplifier, said second switch being controlled by said pulse signal from said output terminal of said first differential amplifier, said output signal corresponding to the ratio of said difference signal to said sum signal being derived from said output terminal of said fourth differential amplifier.

* * * * *